US006606226B2

(12) United States Patent
Bass et al.

(10) Patent No.: US 6,606,226 B2
(45) Date of Patent: Aug. 12, 2003

(54) MAILING MACHINE HAVING A USER INTERFACE CONTROLLER SAFETY INTERLOCK TO PROVIDE PROTECTION FROM HAZARDOUS VOLTAGES

(75) Inventors: Edward R. Bass, Trumbull, CT (US); Maria P. Parkos, Southbury, CT (US); Young W. Lee, Orange, CT (US); Michael J. Lorello, Branford, CT (US)

(73) Assignee: Pitney Bowes, Inc., Stamford, CT (US)

(*) Notice: Subject to any disclaimer, the term of this patent is extended or adjusted under 35 U.S.C. 154(b) by 96 days.

(21) Appl. No.: 10/015,396

(22) Filed: Dec. 13, 2001

(65) Prior Publication Data

US 2003/0114941 A1 Jun. 19, 2003

(51) Int. Cl.[7] .......... H02H 3/00
(52) U.S. Cl. .......... 361/42
(58) Field of Search .......... 361/42, 56, 86, 361/90, 91.1

(56) References Cited

U.S. PATENT DOCUMENTS 6,049,143 A * 4/2000 Simpson et al.
6,265,983 B1 * 7/2001 Baillargeon

* cited by examiner

*Primary Examiner*—Edward H. Tso
(74) *Attorney, Agent, or Firm*—Brian A. Lemm; Angelo N. Chaclas; Charles R. Malandra, Jr.

(57) ABSTRACT

A mailing machine that includes a docking system for the User Interface Controller (UIC) that provides a safety interlock to protect the user from accessing potentially hazardous voltages when the UIC is removed is provided. A docking board provides a connection between the mailing machine and the UIC. The UIC mates with a docking connector on the docking board. Potentially hazardous signal levels pass through a relay on the docking board to the docking connector. A supply voltage for the relay's coil passes through docking board to the UIC and back to the relay on the docking board. If the UIC is removed, the supply voltage for the relay's coil will be removed, causing the relay to open and preventing any of the potentially hazardous signals from being transmitted to the docking connector on the docking board.

14 Claims, 1 Drawing Sheet

MAILING MACHINE HAVING A USER INTERFACE CONTROLLER SAFETY INTERLOCK TO PROVIDE PROTECTION FROM HAZARDOUS VOLTAGES

FIELD OF THE INVENTION

The invention disclosed herein relates generally to mailing machines, and more particularly to a mailing machine having a user interface controller docking board that prevents hazardous voltages from being accessible to a user.

BACKGROUND OF THE INVENTION

Mailing machines often include different modules that automate the processes of producing mailpieces. The typical mailing machine includes a variety of different modules or sub-systems each of which performs a different task on the mailpiece. The mailpiece is conveyed downstream utilizing a transport mechanism, such as rollers or a belt, to each of the modules. Such modules could include, for example, a singulating module, i.e., separating a stack of mailpieces such that the mailpieces are conveyed one at a time along the transport path, a moistening/sealing module, i.e., wetting and closing the glued flap of an envelope, a weighing module, and a metering module, i.e., applying evidence of postage to the mailpiece. The exact configuration of the mailing machine is, of course, particular to the needs of the user.

A control panel device, hereinafter referred to as a User Interface Controller (UIC), performs user interface and controller functions for the mailing machine. Specifically, the UIC provides all user interfaces, executes control of the mailing machine and print operations, calculates postage for debit based upon rate tables, provides the conduit for the Postal Security Device (PSD) to transfer postage indicia to the printer, operates with peripherals for accounting, printing and weighing, and conducts communications with a data center for postage funds refill, software download, rates download, and market-oriented data capture. The UIC, in conjunction with an embedded PSD, provides the system meter that satisfies U.S. and international postal regulations regarding closed system information-based indicia postage (IBIP) meters.

Since the UIC provides the system meter for the mailing machine, it is desirable for the UIC to be easily removable and replaceable by the user. There are problems, however, with the such removal and replacement of the UIC by the user. Since the UIC conducts communications with a data center, it is necessary to have a communication link attached to the UIC. Typically, the communication link includes a telephone line coupled via a cable to the UIC. Preferably, the removal and replacement of the UIC is performed without having to disconnect any cables, including the telephone cable. Utilizing a quick-connect connector can solve the problem of not having to remove any cables, but introduces new problems. For example, ring voltages on a telephone line typically reach hazardous levels, e.g. 90 volts or greater. In addition, voltage levels on a telephone line can reach even higher levels during an electrical storm. The use of a connector for the telephone line can therefore present a serious risk of electric shock to the user when the UIC is not installed, as the pins of the connector may now be accessible by the user.

Thus, there exists a need for a method and system that allows removal and replacement of a UIC from a mailing machine without having to disconnect any cables, while providing protection to the users from potentially dangerous voltages.

SUMMARY OF THE INVENTION

The present invention alleviates the problems associated with the prior art and provides a method and system that allows removal and replacement of a UIC from a mailing machine without having to disconnect or connect any cables, while providing protection to the users from potentially dangerous voltages.

In accordance with the present invention, a mailing machine includes a docking system for the UIC that provides a safety interlock to protect the user from accessing potentially hazardous voltages when the UIC is removed. A docking board is provided on the mailing machine to provide a connection between the mailing machine and the UIC. The UIC mates with a docking connector on the docking board. The telephone line is coupled to the docking board, and the telephone signals pass through a relay on the docking board to the docking connector. A supply voltage for the relay's coil is provided by the mailing machine. The supply voltage passes through docking board to the UIC, via the docking connector, and back to the relay on the docking board. Thus, if the UIC is removed, the supply voltage for the relay's coil will be removed, causing the relay to open. The opening of the relay prevents any signals from the telephone lines, including any possible hazardous voltages, from being transmitted to the docking connector on the docking board. Once the UIC is properly docked with the docking board, the supply voltage will again be applied to the relay to close the relay, and the telephone line signals will be passed through the docking board to the UIC. Accordingly, an exposed docking connector is prevented from having potentially hazardous voltages on it when the UIC is undocked from the mailing machine.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
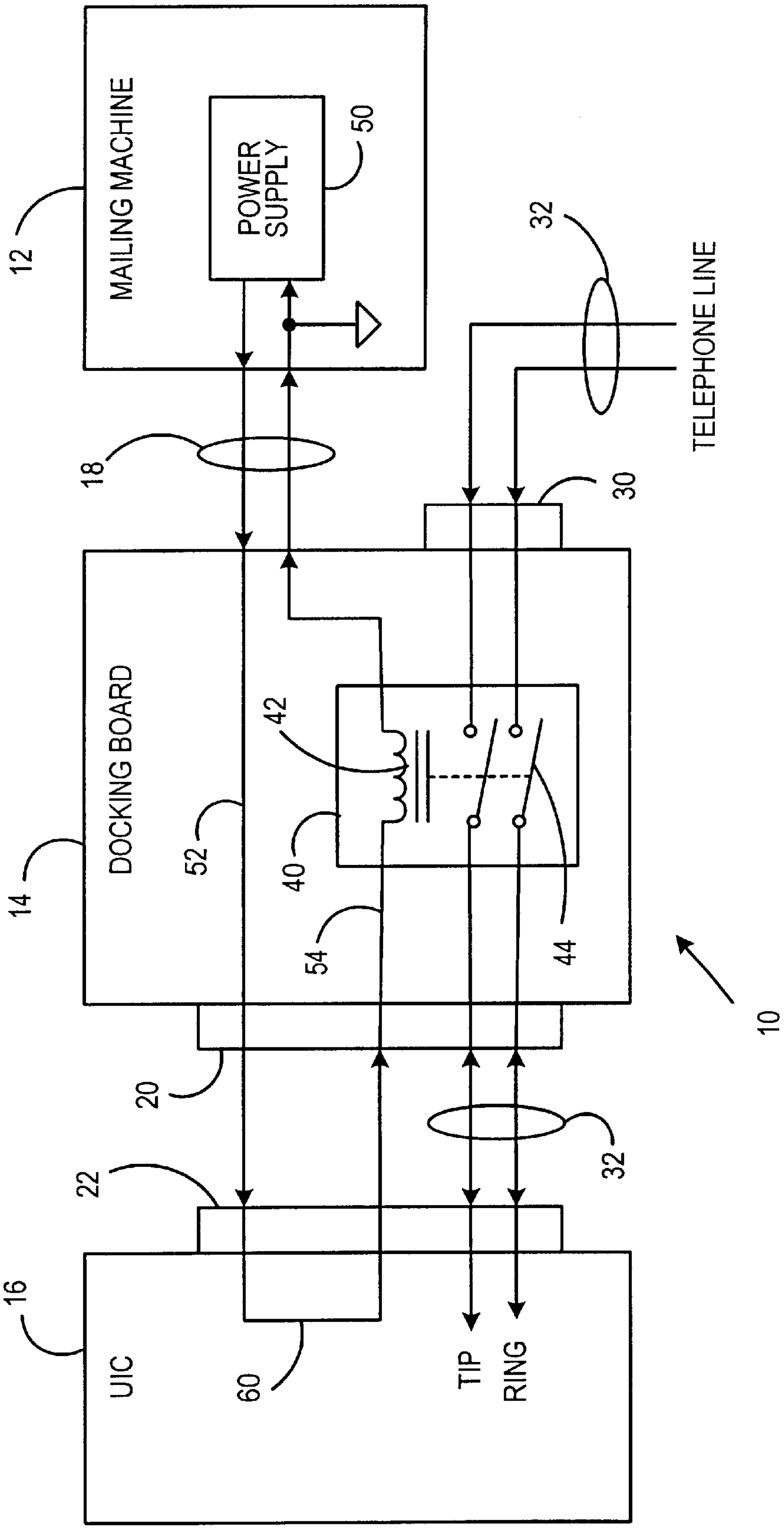
FIG. 1 illustrates in block diagram form a mailing machine having a UIC docking system safety interlock according to the present invention.

In describing the present invention, reference is made to the drawings, wherein there is seen in FIG. 1 a system 10 according to the present invention. System 10 includes mailing machine 12. A docking board 14 is secured to the mailing machine 12, and serves as the primary interface between the User Interface Controller (UIC) 16 and the mailing machine 12. UIC 16, among other things, provides all user interfaces, executes control of the mailing machine 12 and print operations and conducts communications with a data center for postage funds refill, software download, rates download, and market-oriented data capture. To conduct these communications, a telephone line 32 must be provided to UIC 16. As noted above, the voltage levels of signals on telephone line 32 can attain levels that pose a risk of electric shock to users, and therefore should remain inaccessible to users at all times. Thus, according to the present invention, the UIC 16 can be removed and inserted into the system 10, without having to connect or disconnect any cables, while still providing user protection from hazardous voltages.

Docking board 14 is preferably secured internal to the enclosure of the mailing machine 12, except for a docking connector 20. Docking connector 20 protrudes from mailing machine 12 in an area that accommodates UIC 16 and is therefore accessible to the user if UIC 16 is not installed. UIC 16 includes a connector 22 that corresponds to connector 20 on docking board 14. The mating of connectors 20, 22 provides the electrical connections between the UIC 16 and mailing machine 12. Thus, UIC 16 can be inserted and removed from system 10 without having to connect or disconnect any cables.

Docking board 14 further includes a connector 30 for connection of telephone line 32. Since docking board 14 is not required to be removed during normal operation of the system 10, the telephone line 32 can remain coupled to docking board 14, via connector 30, at all times and need not be removed by a user. Docking board 14 further includes a relay 40 having a coil 42 and contacts 44. The ring and tip signals of telephone line 32, from connector 30, pass through the contacts 44 of relay 40 to connector 20. Thus, when the UIC 16 is inserted into the system 10 and connector 22 mates with connector 20, the tip and ring signals of the telephone line 32 will be passed from connector 30 on docking board 14, through the contacts 44 of relay 40, to UIC 16, as long as the contacts 44 of relay 40 are closed.

The opening and closing of the contacts 44 of relay 40 are controlled by applying a voltage to the coil 42. A power supply 50 in mailing machine 12 generates a supply voltage, such as, for example, 5 Volts, that is passed to the docking board 14 by a conductive link, such as, for example, cable 18. The supply voltage is conducted through the docking board 14 via a conductive link 52, such as, for example, a printed wiring board trace, to a first pin on connector 20. Connector 20 also includes a second pin coupled to a conductive link 54, which is coupled to a first end of the coil 42 of relay 40. The other end of the coil 42 of relay 40 is coupled back to the power supply 50 via cable 18.

UIC 16 includes a conductive link 60 that bridges between two pins of conductor 22. Conductive link 60 provides a safety interlock that controls the connection of telephone line 32 to connector 20 of docking board 14 as follows. The pins on connector 22 bridged by conductive link 60 correspond to the first and second pins of connector 20 described above. Accordingly, when UIC 16 is inserted into the system 10 and connector 22 mates with connector 20, the coil 42 of relay 40 is coupled to the supply voltage from power supply 50 via conductive link 52 of docking board 14, conductive link 60 of UIC 16, and conductive link 54 of docking board 14. When the coil 42 of relay 40 is energized by the supply voltage from power supply 50, contacts 44 will close, thereby coupling connector 20 to the telephone line 32. Since UIC 16 is coupled to connector 20 via connector 22, UIC 16 will in turn be coupled to telephone line 32 such that UIC 16 can conduct communications utilizing the telephone line 32.

When UIC 16 is removed from the system 10, the coil 42 of relay 40 will be disconnected from power supply 50 since conductive link 60 will be removed. When the supply voltage from power supply 50 is removed from the coil 42 of relay 40, the contacts 44 will open, thereby disconnecting the telephone line 32 from connector 20. Thus, when connector 20 is accessible to a user, i.e., when UIC 16 is not present in the system 10, the telephone line 32 is disconnected from the connector 20 by relay 40. By disconnecting the telephone line 32 from connector 20, any potentially hazardous voltage levels are prevented from appearing on connector 20.

Thus, according to the present invention, a mailing machine 10 includes a docking system for the UIC 16 that allows removal of the UIC 16 without having to disconnect any cables while providing a safety interlock to protect the user from accessing potentially hazardous voltages when the UIC 16 is removed.

It should be understood that although the present invention was described with respect to mailing machines, the present invention is not so limited and is applicable to any type of system having removable components in which hazardous voltage levels may present a safety issue. Additionally, while the hazardous voltage levels were described above as originating from a telephone line, the invention is not so limited and can be utilized to protect a user from any source of potentially hazardous voltage levels, such as, for example, any voltage levels that exceed 30 Volts rms. While a preferred embodiment of the invention has been described and illustrated above, it should be understood that this is exemplary of the invention and is not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A mailing system comprising:

a mailing machine;

a removable user interface; and a docking board to couple said removable user interface to said mailing machine, said docking board comprising:

a docking connector to couple with said removable user interface; and a relay having a coil and a plurality of contacts, a first end of said coil being coupled to a first pin of said docking connector, a first portion of said plurality of contacts being coupled to respective other pins of said docking connector, a second portion of said plurality of contacts being coupled to a signal line, wherein said coil is powered thereby causing said plurality of contacts to close and couple said signal line to said respective pins of said docking connector only when said removable user interface connector is coupled with said docking connector.

2. The system according to claim 1, wherein said removable user interface further comprises:

a connector to mate with said docking connector, said connector having a plurality of pins; and a bridging conductor to couple a first of said plurality of pins to a second of said plurality of pins, said bridging conductor conducting a supply voltage from said first pin to said second pin, said second pin providing said supply voltage to said first pin of said docking connector, said first pin of said docking connector providing said supply voltage to said coil of said relay to power said coil.

3. The system according to claim 2, wherein said mailing machine further includes a power supply to generate said supply voltage, said supply voltage being conducted to said docking connector of said docking board, said docking connector conducting said supply voltage to said first pin of said removable user interface connector.

4. The system according to claim 1, wherein said signal line is a telephone line.

5. The system according to claim 1, wherein said signal line conducts hazardous voltage levels.

6. A removable user interface controller for a mailing machine comprising:

a connector to mate with a docking connector of a docking board, said connector having a plurality of pins; and a bridging conductor to couple a first of said plurality of pins to a second of said plurality of pins, said bridging conductor conducting a supply voltage from said first pin to said second pin, said second pin providing said supply voltage to a first pin of said docking connector, said first pin of said docking connector providing said supply voltage to a coil of a relay on said docking board to power said coil, a plurality of contacts of said relay closing in response to said coil being powered, said plurality of contacts closing causing a signal line coupled to said docking board to be coupled to said docking connector of said docking board.

7. The removable user interface controller according to claim 6, wherein said signal line is a telephone line.

8. A docking board for coupling a removable user interface controller to a machine, said docking board comprising:

a docking connector to couple with said removable user interface; and a relay having a coil and a plurality of contacts, a first end of said coil being coupled to a first pin of said docking connector, a first portion of said plurality of contacts being coupled to respective other pins of said docking connector, a second portion of said plurality of contacts being coupled to a signal line, wherein said coil is powered thereby causing said plurality of contacts to close and couple said signal line to said respective pins of said docking connector only when said removable user interface is coupled with said docking connector.

9. The docking board according to claim 8, wherein said machine is a mailing machine.

10. The docking board according to claim 8, wherein said signal line is a telephone line.

11. The docking board according to claim 8, wherein said signal line conducts hazardous voltage levels.

12. A safety interlock for preventing a voltage signal from occurring on a first connector when said first connector is accessible to a user, said safety interlock comprising:

a relay having a coil and a plurality of contacts, a first end of said coil being coupled to a first pin of said first connector, a first portion of said plurality of contacts being coupled to respective other pins of said first connector, a second portion of said plurality of contacts being coupled to a signal line, said signal line conducting said voltage signal;

a second connector adapted to mate with said first connector, said second connector having a plurality of pins, said first connector being inaccessible to a user when said second connector is coupled to said first connector; and a bridging conductor to couple a first of said plurality of pins of said second connector to a second of said plurality of pins of said second connector, said bridging conductor conducting a supply voltage received from said first connector on said first pin of said second connector to said second pin of said second connector, said second pin of said second connector providing said supply voltage back to said first pin of said first connector, said first pin of said first connector providing said supply voltage to said coil of said relay to power said coil, wherein said coil is powered thereby causing said plurality of contacts to close and couple said signal line to said respective pins of said first connector only when said second connector is coupled with said first connector.

13. The safety interlock according to claim 12, wherein said signal line is a telephone line.

14. The safety interlock according to claim 12, wherein said voltage signal is a hazardous voltage levels.

* * * * *